(12) United States Patent
Pontes Bittencourt

(10) Patent No.: US 11,479,728 B2
(45) Date of Patent: Oct. 25, 2022

(54) PROCESS FOR PREPARING LIQUID HYDROCARBONS BY THE FISCHER-TROPSCH PROCESS INTEGRATED INTO REFINERIES

(71) Applicant: PETROLEO BRASILEIRO S.A.—PETROBRAS, Rio de Jainero (BR)

(72) Inventor: Roberto Carlos Pontes Bittencourt, Rio de Jainero (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 15 days.

(21) Appl. No.: 17/274,647

(22) PCT Filed: Sep. 11, 2019

(86) PCT No.: PCT/BR2019/050387
§ 371 (c)(1),
(2) Date: Mar. 9, 2021

(87) PCT Pub. No.: WO2020/051663
PCT Pub. Date: Mar. 19, 2020

(65) Prior Publication Data
US 2021/0340447 A1     Nov. 4, 2021

(30) Foreign Application Priority Data
Sep. 11, 2018 (BR) .................. 102018068334 9

(51) Int. Cl.
*C10G 2/00* (2006.01)
*C01B 3/38* (2006.01)
(Continued)

(52) U.S. Cl.
CPC ................. *C10G 2/332* (2013.01); *C01B 3/38* (2013.01); *C01B 3/48* (2013.01); *C01B 3/56* (2013.01);
(Continued)

(58) Field of Classification Search
CPC .......... C10G 2/332; C10G 2/333; C10G 2/50; C10G 2300/4081; C10G 2300/41;
(Continued)

(56) References Cited

U.S. PATENT DOCUMENTS 4,626,552 A    12/1986   Arcuri
5,648,312 A     7/1997   Rivas et al.
(Continued)

FOREIGN PATENT DOCUMENTS

WO      03/002252 A1    1/2003
WO    2004/000456 A2   12/2003
(Continued)

*Primary Examiner* — Jafar F Parsa
(74) *Attorney, Agent, or Firm* — J.A. Lindeman & Co. PLLC

(57) ABSTRACT

The present invention relates to a process for preparing liquid hydrocarbons by the Fischer-Tropsch process integrated into refineries, in particular comprising recycling streams from the steam reforming hydrogen production process as the feedstock for the Fischer-Tropsch process.

19 Claims, 1 Drawing Sheet

(51) Int. Cl.
    *C01B 3/48*     (2006.01)
    *C01B 3/56*     (2006.01)

(52) U.S. Cl.
    CPC ............... *C10G 2/333* (2013.01); *C10G 2/50* (2013.01); *C01B 2203/0233* (2013.01); *C01B 2203/0283* (2013.01); *C01B 2203/043* (2013.01); *C01B 2203/062* (2013.01); *C01B 2203/0827* (2013.01); *C01B 2203/1058* (2013.01); *C01B 2203/1241* (2013.01); *C01B 2203/148* (2013.01); *C10G 2300/4006* (2013.01); *C10G 2300/4056* (2013.01); *C10G 2300/4081* (2013.01); *C10G 2300/42* (2013.01); *C10G 2300/70* (2013.01); *C10G 2400/02* (2013.01); *C10G 2400/04* (2013.01); *C10G 2400/10* (2013.01)

(58) Field of Classification Search
    CPC ............ C10G 2300/42; C10G 2300/70; C10G 2300/04; C10G 2300/02; C01B 2203/062; C01B 2203/0827; C01B 2203/1058; C01B 2203/148
    See application file for complete search history.

(56) References Cited

U.S. PATENT DOCUMENTS

| | | | |
|---|---|---|---|
| 6,274,029 | B1 | 8/2001 | Wittenbrink et al. |
| 7,214,720 | B2 | 5/2007 | Bayle et al. |
| 2002/0028745 | A1 | 3/2002 | Krylova et al. |
| 2004/0248999 | A1* | 12/2004 | Briscoe ............ F25J 1/021 |
| | | | 518/703 |
| 2018/0291295 | A1* | 10/2018 | Jack .................. B01J 8/26 |

FOREIGN PATENT DOCUMENTS

| | | |
|---|---|---|
| WO | 2010/090863 A2 | 8/2010 |
| ZA | 20005666 | 10/2000 |

\* cited by examiner

PROCESS FOR PREPARING LIQUID HYDROCARBONS BY THE FISCHER-TROPSCH PROCESS INTEGRATED INTO REFINERIES

FIELD OF THE INVENTION

This invention refers to a process for preparing liquid hydrocarbons using the Fischer-Tropsch process integrated into refineries.

BACKGROUND OF THE INVENTION

The Fischer-Tropsch synthesis reaction has merited a great deal of attention due to its technological and scientific interest. This interest is associated with converting hydrocarbons into high-quality, high-aggregated value liquid products. Said reaction involves catalytic hydrogenation of carbon monoxide (CO) to produce liquid hydrocarbons, such as gasoline, diesel and lubricants, from synthesis gas. Since the invention of the original process by Franz Fischer and Hans Tropsch, many refinements and adjustments have been made.

Essentially, the Fischer-Tropsch reaction to convert synthesis gas, which consists of a mixture whose principal components are $H_2$ and CO, may be characterized by the global reaction scheme:

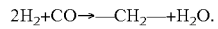

$$2H_2 + CO \rightarrow -CH_2- + H_2O.$$

The hydrocarbons produced in the Fischer-Tropsch reaction vary from methane to paraffinic hydrocarbons containing more than 100 carbon atoms.

The Fischer-Tropsch reaction may be conducted in several types of reactors, including the traditional fixed, fluidized or moveable bed reactors, the three-phase slurry bubble, and more recently the so-called micro or "mili-channel" reactors ("stacked multi-channel reactor").

Currently, there are industrial complexes in operation in South Africa based on the large-scale Fischer-Tropsch route (with installed capacity of 7,500,000 tons/year) producing chemicals, linear olefins, gasoline, diesel and lubricants, in Malaysia (capacity of 500,000 tons/year), and in Qatar.

In general the Fischer-Tropsch process has four main sections: generation of synthesis gas; purification of the gas; Fischer-Tropsch synthesis; and treatment of the products. Nearly 60 to 70% of the cost of capital of the Fischer-Tropsch process is associated with the synthesis gas production step, whether it is produced from natural gas or coal. The cost of the Fischer-Tropsch synthesis portion comprises nearly 20% of the costs, and the refining operations are around 10%. The refining operations include the steps of hydrotreating, hydroisomerization for production of diesel, and hydrocracking to convert heavy fractions.

Indeed, the high cost of capital for implementing the Fischer-Tropsch process has limited its use in strategic situations to reduce outside dependency on oil, or to value natural gas in remote regions or with wide-ranging excess production. As an example, for an FT unit of 50,000 barrels/day using coal (12,000 tons/day) and biomass (1412 tons/day), the estimated investment is US$ 5.8 billion.

The literature on Fischer-Tropsch catalysts and processes is extensive, with nearly 4000 publications in the year 1954, and a similar number of patents. However, despite being well known, the potential for innovation in the area of Fischer-Tropsch processes is still high. Recent patents are, for example, related to subjects on use of the gas separated from the liquid products ("tail gas") as fuel, feedstock for the production section of synthesis gas, recovery of light hydrocarbons or other components.

Furthermore, the integration of processes seeking to reduce Fischer-Tropsch costs and to achieve greater energy efficiency is revealed. Document US 2016/0293985 teaches integration of the Fischer-Tropsch process with the process of producing synthesis gas using the solid oxide fuel cell method.

Document US 2016/0003480, in turn, teaches the integration of the Fischer-Tropsch gasification processes, and co-generation.

Particularly in relation to the integration of Fischer-Tropsch processes with refining processes, there are several routes taught in the state of the art.

U.S. Pat. No. 9,328.291 teaches the use of heavy fractions generated in a refinery (bitumen, heavy oil, or coke) for production of synthesis gas by the gasification process, and its use in the Fischer-Tropsch process.

Document US 2010/0108568 teaches integration of hydrocracking, oligomerization, alkylation and hydrotreating with the Fischer-Tropsch process, with the intent of producing aviation kerosene.

Document EP 2487225 teaches use of the naphtha fraction produced in the Fischer-Tropsch process as feedstock for the synthesis gas generation unit, in order to maximize the production of middle distillates (diesel and aviation kerosene).

Furthermore, methods of producing synthesis gas for use in Fischer-Tropsch processes with alternative processes for steam reforming are described.

Document U.S. Pat. No. 6,043,288 teaches a process for producing synthesis gas causing a stream of gaseous hydrocarbon, oxygen, and, optionally, steam, to react. Said process may be classified in general in the process known as autothermal reforming, when using a catalyst, or partial oxidation, when the presence of a catalyst is absent. Said processes are inconvenient from the industrial point of view of using $O_2$, which is expensive to prepare.

Patent application PI 0508327-3 reveals a process for producing a hydrogen-rich stream from streams containing a low concentration of hydrogen, using one or more reverse selective membranes that are carbon dioxide permeable, and thus they concentrate the stream in the other components. Gas containing a low concentration of hydrogen may come from a Fischer-Tropsch section.

Therefore, despite the fact that there are numerous specialized citations and descriptions of Fischer-Tropsch processes in the literature, there is still a need to provide a process that uses a low-cost raw material to produce Fischer-Tropsch derivatives in small-scale units, and their integration with existing refinery units.

SUMMARY OF THE INVENTION

This invention relates to a process for preparing liquid hydrocarbons by the Fischer-Tropsch process integrated with existing hydrogen generation units, in particular comprising recycling streams arising from the steam-reforming hydrogen generation process.

BRIEF DESCRIPTION OF THE FIGURES

The detailed description presented below references the annexed figures.

DETAILED DESCRIPTION OF THE INVENTION

This invention refers to a process for preparing liquid hydrocarbons through the Fischer-Tropsch process integrated into hydrogen generation units, in particular comprising recycling streams arising from the steam-reforming hydrogen generation process as the feedstock in the small-scale Fischer-Tropsch process.

Figure 1:
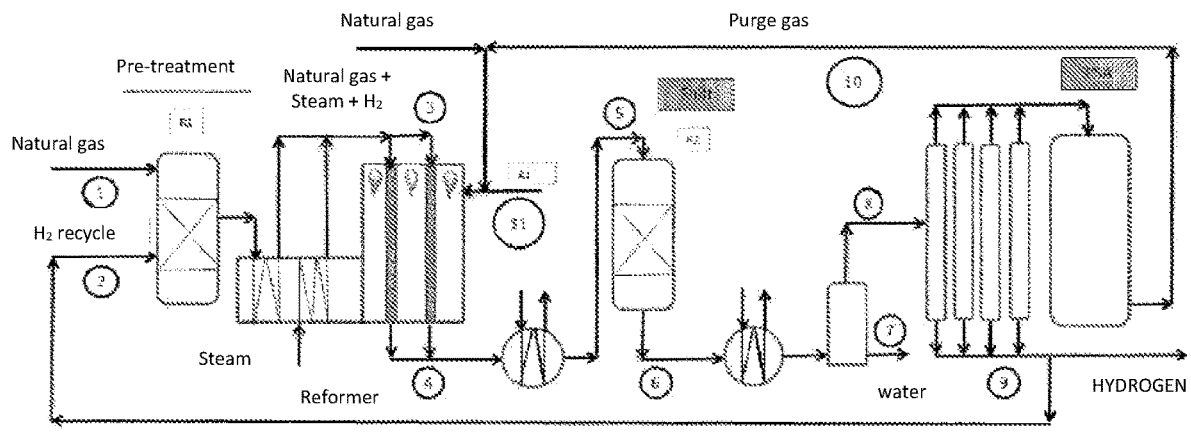
FIG. 1 presents a simplified flowchart of the steam-reforming hydrogenation process.

As shown in FIG. 1, the hydrogen generation process is initiated with the supply of a hydrocarbons stream as the initial feedstock, which may be natural gas, liquefied petroleum gas (LPG), refinery gas or naphtha (stream 1) together with part of the hydrogen produced in the unit itself (stream 2) into a pre-treatment reactor containing catalyst and fixed-bed absorbents. The principal function of this reactor is to remove organic and inorganic compounds containing sulfur.

However, depending on the type of feedstock, said reactor may also have the functions of removal of chlorides and olefins.

Typical operating conditions involve pressure with values between about 10 kgf/cm² (0.98 MPa) and about 40 kgf/cm² (3.92 MPa), and temperatures in the range of about 250° C. and about 400° C., containing CoMo/alumina or NiMo/alumina-type catalysts in various forms.

The mixture of hydrocarbons feedstock, recycled hydrogen and steam (stream 3) generated in the unit itself in heat-recovery sections, feeds the primary reformer. This equipment consists of an oven containing a set of pipes, typically with a diameter of 101.2 mm and between 8 to 12 m high, inside of which is a fixed-bed catalyst containing nickel in a refractory support, such as alumina, calcium aluminate, or magnesium, which causes the principal reactions of reform (1) and shift (2), exemplified below:

$$C_nH_{2m}+nH_2O \rightarrow nCO+H_{2(m+n)} \quad (1)$$

$$CO+H_2O \rightarrow CO_2+H_2 \quad (2)$$

The steam is fed into the process in stoichiometry excess of the reactions (1 and 2) in order to prevent the accumulation of coke on the catalyst. Typical operating conditions in the section of the primary reformer are temperatures between about 450° C. and about 550° C. (pipe inlet) and 800° C. to 950° C. (pipe outlet), pressures between about 10 kgf/cm² (0.98 MPa) and about 40 kgf/cm² (3.92 MPa) and steam/carbon ratios between 2 to 5 mol/mol. The reactions (1 and 2) are on balance sufficiently endothermic, such that the necessary heat is provided by burning fuel, whose largest part is formed of so-called "purge gas" (stream 10), complemented by external fuel, which may typically be natural gas or refinery gas.

The effluent process gas from the reformer (stream 4) is a mixture of $CH_4$, CO, $CO_2$, $H_2$ and steam, with a composition close to thermodynamic equilibrium. In a condition of outlet temperature from the reformer of about 840° C., pressure of anout 25.2 kgf/cm² (2.47 MPa) and steam/carbon ratio of about 3.0 mol/mol, the effluent composition of the reformer in dry basis (% v/v) is 70.2% $H_2$, 12.3% CO, 8.9% $CO_2$, and 8.4% $CH_4$. This gas is cooled with steam generated from the boiler water, and then it is fed into the "Shift" reactor (stream 5).

The shift reactor typically contains a catalyst based on iron, chrome and copper oxides ("high temperature shift") and it catalyzes the conversion reaction of the CO (reaction 2). Typical operating conditions are temperatures between about 330° C. (inlet) and about 450° C. (outlet), pressure between about 10 kgf/cm² (0.98 MPa) and about 40 kgf/cm² (3.92 MPa). The effluent composition from the reactor (stream 6) is a mixture of $CH_4$, CO, $CO_2$, $H_2$ and steam with a composition close to thermodynamic equilibrium. For an outlet temperature from the reactor of about 425° C., pressure of about 24.4 kgf/cm² (2.39 MPa) and a steam/carbon ratio of about 3.0 mol/mol in the reformer, the effluent composition from the shift reactor in a dry basis (% v/v) is 72.5% $H_2$, 3.5% CO, 16.0% $CO_2$, and 7.8% $CH_4$.

The effluent stream from the shift reactor (stream 6) is then cooled to typical temperatures of about 20 to about 45° C. and sent to a condensate separation vessel, where an aqueous stream is generated (stream 7) and a gaseous stream is generated (stream 8). The aqueous stream may be treated and recycled to the steam generation system of the unit itself, or sent to refinery boiler water treatment stations. The gaseous stream (stream 8) is then sent to the "Pressure Swing Absorption" (PSA) section for separation and recovery of the hydrogen produced in the process.

The PSA section is formed of several reactors containing adsorbent material in beds comprised of alumina, active carbon, and zeolites that allow the separation of a high-pressure hydrogen stream with purity of higher than 99.99% and a gaseous stream containing the so-called purge gas (stream 10) at low pressure, comprised of $CH_4$, CO, $CO_2$ and $H_2$, which returns to the reformer as fuel. The composition of the purge gas is typically 25 to 35% $H_2$; 35 to 55% $CO_2$, 10 to 30% $CH_4$, and 8 to 15% CO.

The purge gas is produced in high quantities. For example, for a small-scale hydrogen production unit (550,000 Nm³/d), a typical volumetric ratio of purge gas to produced hydrogen would be 0.64 (Nm³/Nm³), that is, around 350,000 Nm³/day of purge gas would be produced. Larger-scale hydrogen generation units by the steam-reforming process, may reach values on the order of 3,500,000 Nm³/d of produced hydrogen, which corresponds to more than 2,000,000 Nm³/d of associated purge gas, which, in the current technology, is a sub-product used as fuel in the unit.

Therefore, the purpose of this invention is to provide a process for preparing liquid hydrocarbons by the small-scale Fischer-Tropsch process integrated into refinery units, preferably already-existing refinery units, employing recycling of the gaseous stream from the steam-reforming hydrogen generation process, preferably a gaseous stream coming from the PSA section of the steam-reforming hydrogen generation process, such as the purge gas, as the feedstock in the Fischer-Tropsch process, in which the carbon dioxide content is at least 20% and the hydrogen content is preferably lower than 50% v/v.

Figure 2:
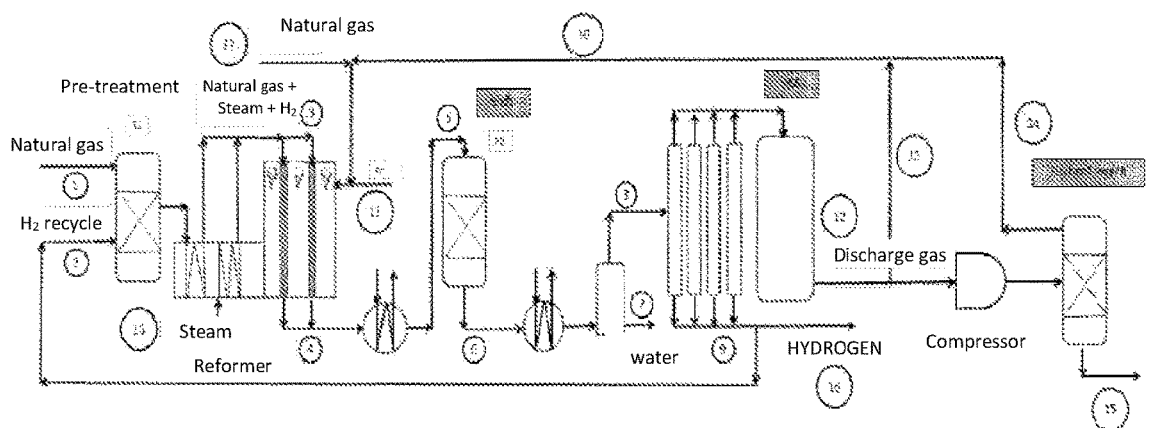
FIG. 2 presents a simplified flowchart of integrating the Fischer-Tropsch process with a steam-reforming hydrogen generation unit.

FIG. 2 shows a process for preparation of liquid hydrocarbons by the Fischer-Tropsch process integrated into refining units, in which there is specifically the recycling of the purge gas coming from the PSA section of the steam-reforming hydrogen production unit (stream 12), as the only feedstock in the Fischer-Tropsch process, which is submitted to compression at a typical pressure that is lower than about 0.5 kgf/cm² (0.049 MPa) to about 4 kgf/cm² (0.39 MPa) to about 40 kgf/cm² (3.92 MPa). Optionally, a part of the purge gas stream is not compressed (stream 13) and is sent to comprise the reformer fuel.

The compressed purge gas is then fed into a Fischer-Tropsch reactor, where it comes into contact with a catalyst, with the conversion of $H_2$ and CO to liquid products containing hydrocarbons occurring, such as gasoline, diesel and lubricants (stream 15).

The liquid fraction (stream 15) is comprised of a mixture of liquid hydrocarbons comprising from the distillation range of the naphtha to the wax, called synthetic oil, which may also contain variable contents of oxygenated compounds and water. This stream may be sent to a dedicated separation process, where the fractions of gasoline, diesel and lubricants will be obtained, and due to the fact that they do not have sulfur, they may comprise the final stream of these liquid by-products from the refinery by direct mixture. Alternatively, the synthetic oil may be processed at existing units in the refinery, when the objective is to reduce fixed investments.

In a preferred option, when the objective is low fixed investments, the liquid products generated in the Fischer-Tropsch section are initially separated into an aqueous stream and an oleaginous stream, which are then sent to existing units at the refinery, preferably to the sections of distillation, hydrotreating, and treatment of effluents. As an example, the oleaginous stream (synthetic oil) returns to the refinery's distillation unit, with the distilled fractions comprising the feedstock for the gasoline, diesel and lubricant hydrotreatment units. The aqueous stream may be sent to the already-existing acid water unit at the refinery, for adequate disposal. To one skilled in the art, several other schemes for processing synthetic oil in an existing refinery are possible as a function of the type and characteristics of the existing units.

The unconverted gaseous fraction containing light hydrocarbons generated in the process, with molecular weight less than or equal to pentane, known as "tail gas," in a preferred option, returns to the hydrogen generation process to comprise the reformer fuel (stream 14). In an alternative option, the tail gas may be sent to a light olefin recovery section.

The Fischer-Tropsch reaction may be conducted in well-known and widely used reactors, such as fixed bed ("multitubular fixed bed") or moveable bed, "slurry bed," circulating fluidized bed ("CFB") and fixed fluidized bed ("FFB"). Compact reactors ("stacked multi-channel reactor") that are "mili" or "micro-channel" type are particularly suitable for the production capacities sought in the present invention.

The Fischer-Tropsch reaction preferably uses a catalyst containing cobalt oxide on support types including alumina, titanium, aluminates, silica, zirconia or a mixture thereof, and it may also contain noble metals such as Pt, Re or Ru in their composition as promoters, operating at temperatures between about 180 to about 300° C., preferably about 190° C. to 250° C., and pressures between about 4 kgf/cm$^2$ (0.39 MPa) to about 30 kgf/cm$^2$ (2.94 MPa). Such an arrangement is particularly suitable for producing diesel and waxes with low production of oxygenates generated as sub-products in the reaction.

The cobalt-based catalyst of the Fischer-Tropsch step also contains noble metals selected from among Pt, Re or Ru as promoters. Also, preferably, they may contain copper as a promoter, in order to favor the occurrence of the "shift" reaction, zeolites to reduce wax content, or a combination thereof.

Alternatively, the catalyst of the Fischer-Tropsch section may be iron oxide-based and it may contain promoters of silica, copper, noble metals and alkaline metals selected from amongst potassium oxide ($K_2O$), copper oxides, silica, zinc oxide, or a combination thereof. In this case the section preferably operates at temperatures between about 250° C. to about 400° C., more preferably between about 300° C. to 350° C.

The Fischer-Tropsch section may contain one or more reaction stages, depending on whether the objective is to reduce fixed costs or to maximize the yield from liquid products, respectively.

The Fischer-Tropsch section should contain means of catalyst regeneration for removal of coke, typically by the passage of diluted air and temperatures between about 200° C. to about 400° C., and reduction of the catalyst with $H_2$ and/or diluted purge gas. The use of $N_2$ or steam is particularly desirable for dilution.

The purge gas fed into the Fischer-Tropsch process from a natural-gas fired steam-reforming unit comprises methane, hydrogen, carbon monoxide and carbon dioxide, in which, preferably the carbon dioxide content is at least 20% and the hydrogen content is preferably lower than 50% v/v. More specifically, the composition of the purge gas typically contains 25 to 35% $H_2$, 35 to 55% $CO_2$, 10 to 30% $CH_4$, and 8 to 15% CO, with a an $H_2$:CO ratio between about 1.2 and about 5.5 mol/mol.

This invention allows integrating the small-scale Fischer-Tropsch process into existing refinery units, allowing there not to be alterations to the already-existing hydrogen unit, and without the need for distillation and treatment sections for products and effluents from the Fischer-Tropsch unit. In a scenario in which it is wished to reduce the fixed costs of the process, it is not desirable to have a high degree of purge gas conversion, since in this situation it would be necessary to replace the reformer's burners that use purge gas to burn another fuel, such as natural gas.

One option that is particularly useful for existing hydrogen production units that are operating below their nominal capacity, and consequently with excess capacity in the "PSA" system for reducing the $H_2$:CO ratio of the purge gas, is to reduce the inlet temperature from the shift reactor until the CO "escape" is observed. For commercial High Temperature Shift Catalysts ("HTS"), the temperature may be adjusted between about 280° C. to about 300° C. so that there is a CO escape and consequent reduction of the $H_2$:CO ratio.

The following examples show the various embodiments of this invention.

EXAMPLES

Example 1

This example illustrates the configuration of the process according to this invention. An industrial hydrogen production unit by the steam-reforming process with capacity of 1,100,000 Nm$^3$/d of $H_2$ at 99.99% operating in the capacity of "design" presented in Table 1, produces 1099.12 kmol/h of purge gas with the composition described in Table 1, in accordance with the state of the art. The purge gas, according to this invention, may be sent to a small-scale Fischer-Tropsch unit, operating at 200° C., pressure of 5 bar (0.5 MPa) and with a cobalt-based catalyst. The gaseous fraction arising from the Fischer-Tropsch process may be returned to the reformer as fuel, and complemented with natural gas to provide the reaction heat necessary for the steam-reforming step. The process allows producing a mixture containing around 487.5 kg/h of gasoline, 46.1 kg/h of diesel, and 0.2 kg of paraffins, which may be returned to the distillation section of the refinery for cost reductions, preferably, or separated and purified. The aqueous fraction arising from the Fischer-Tropsch process (condensed) may be sent, preferably, to the effluents treatment section of the refinery, or to the acid water section.

TABLE 1

Production of liquid derivatives from the Fischer-Tropsch process using purge gas from a hydrogen production unit by the steam-reforming process.

| Condition/Variable | Unit | Design | Invention | Stream |
|---|---|---|---|---|
| Discharge of natural gas feedstock | Kmol/h | 751.443 | 751.443 | 1 |
| Discharge of steam feedstock | Kmol/h | 2684.875 | 2684.875 | 18 |
| Recycled $H_2$ | Kmol/h | 35.747 | 35.747 | 2 |
| V/C Ratio | Mol/mol | 3.5 | 3.5 | |
| $H_2$/feedstock ratio | Mol/mol | 0.047 | 0.047 | |
| Outlet temp. from the reformer | ° C. | 850 | 850 | 4 |
| Outlet pressure from the [ . . . ] | Kgf/cm$^2$ | 22.5 | 22.5 | 4 |
| Effluent from the reformer (b · s) | | | | 4 |
| CO | % v/v | 12.50 | 12.50 | |
| $CO_2$ | % v/v | 9.37 | 9.37 | |
| $H_2$ | % v/v | 73.33 | 73.33 | |
| $CH_4$ | % v/v | 4.56 | 4.56 | |
| $N_2$ | % v/v | 0.25 | 0.25 | |
| Inlet temperature of the [ . . . ] | ° C. | 371 | 371 | 5 |
| Outlet temperature from HTS | ° C. | 428 | 428 | 5 |
| Effluent from the HTS (b · s) | | | | 6 |
| CO | % v/v | 3.68 | 3.68 | |
| $CO_2$ | % v/v | 16.47 | 16.47 | |
| $H_2$ | % v/v | 75.42 | 75.42 | |
| $CH_4$ | % v/v | 4.20 | 4.20 | |
| $N_2$ | % v/v | 0.23 | 0.23 | |
| Production of $H_2$ | Nm$^3$/d | 1,100,000 | 1,100,000 | 16 |
| Discharge of purge gas (3) | Kmol/h | 1099.117 | 841.8 | 12 |
| Composition of "[ . . . ] gas | | 12 | 14 | 12 or 14 |
| CO | % v/v | 10.71 | 2.80 | |
| $CO_2$ | % v/v | 48.01 | 62.69 | |
| $H_2$ | % v/v | 28.57 | 14.81 | |
| $CH_4$ | % v/v | 12.24 | 17.27 | |
| $N_2$ | % v/v | 0.47 | 0.61 | |
| $C_2H_6$ | % v/v | 0 | 0.88 | |
| $C_3H_8$ | % v/v | 0 | 0.57 | |
| $C_4H_{10}$ | % v/v | 0 | 0.61 | |
| Fuel for the [ . . . ] | Kg/h | 3176 | 3905 | 17 |
| Condensation from the section of [ . . . ] | Kmol/h | 1522 | 1522 | 15 |
| Fischer-Tropsch production | | | | 15 |
| Gasoline | Kg/h | — | 487.5 | |
| Diesel | Kg/h | — | 46.1 | |
| Paraffins | Kg/h | — | 0.2 | |

(1) Composition of the natural gas (% v/v): $CH_4$=89.85; $C_2H_6$=8.04; $C_3H_8$=0.42; $CO_2$=0.69 and $N_2$=1.0; Cp of fuel gas=0.501 kcal/kg° C.; (2) Cobalt-based catalyst, temperature of 200° C. and pressure of 5 bar and assuming a conversion of 80% of the CO contained in the purge gas; (3) For the "invention" case, the purge gas signifies the residual gas arising from the Fischer-Tropsch section. Streams refer to the numbering presented in FIG. 2.

Example 2

In this example, the process conditions (steam/carbon ratio) of the steam-reforming section are adjusted for higher production of liquid derivatives, in accordance with this invention.

TABLE 2

Production of liquid derivatives from the Fischer-Tropsch process using purge gas from a hydrogen production unit by the steam-reforming process.

| Condition/Variable | Unit | Design | Invention | Stream |
|---|---|---|---|---|
| Discharge of natural gas feedstock | Kmol/h | 751.443 | 715.66 | 1 |
| Discharge of steam feedstock | Kmol/h | 2684.875 | 2301.348 | 18 |
| Recycled $H_2$ | Kmol/h | 35.747 | 35.747 | 2 |
| V/C Ratio | Mol/mol | 3.5 | 3.00 | |
| $H_2$/feedstock ratio | Mol/mol | 0.047 | 0.047 | |
| Outlet temp. from the reformer | ° C. | 850 | 850 | 4 |
| Outlet pressure from the [ . . . ] | Kgf/cm$^2$ | 22.5 | 22.5 | 4 |
| Effluent from the reformer (b · s) | | | | 4 |
| CO | % v/v | 12.50 | 15.08 | |
| $CO_2$ | % v/v | 9.37 | 9.29 | |
| $H_2$ | % v/v | 73.33 | 80.52 | |
| $CH_4$ | % v/v | 4.56 | 6.56 | |
| $N_2$ | % v/v | 0.25 | 0.29 | |
| Inlet temperature of the [ . . . ] | ° C. | 371 | 300 | 5 |
| HTS exit temperature | ° C. | 428 | 353 | 5 |
| Effluent from the HTS (b · s) | | | | 6 |
| CO | % v/v | 3.68 | 6.43 | |
| $CO_2$ | % v/v | 16.47 | 15.88 | |
| $H_2$ | % v/v | 75.42 | 72.23 | |
| $CH_4$ | % v/v | 4.20 | 7.77 | |
| $N_2$ | % v/v | 0.23 | 0.26 | |
| Production of $H_2$ | Nm$^3$/d | 1,100,000 | 860.859 | 16 |
| Discharge of purge gas (3) | Kmol/h | 1,099.117 | 947 | |
| Composition of purge gas | | 12 | 14 | 12 or 14 |
| CO | % v/v | 10.71 | 5.00 | |
| $CO_2$ | % v/v | 48.01 | 63.72 | |
| $H_2$ | % v/v | 28.57 | 2.0 | |
| $CH_4$ | % v/v | 12.24 | 25.54 | |
| $N_2$ | % v/v | 0.47 | 1.04 | |
| $C_2H_6$ | % v/v | 0 | 1.24 | |
| $C_3H_8$ | % v/v | 0 | 0.88 | |
| $C_4H_{10}$ | % v/v | 0 | 0.61 | |
| Fuel for the [ . . . ] | Kg/h | 3176 | | 17 |
| Condensation from the section of [ . . . ] | Kmol/h | 1522 | 1265 | |
| Fischer-Tropsch production | | | | 15 |
| Gasoline | Kg/h | — | 826.3 | |
| Diesel | Kg/h | — | 137.3 | |
| Paraffins | Kg/h | — | 1.5 | |

(1) Composition of the natural gas (% v/v): $CH_4$=89.85; $C_2H_6$=8.04; $C_3H_8$=0.42; $CO_2$=0.69 and $N_2$=1.0; Cp of fuel gas=0.501 kcal/kg° C.; (2) Cobalt-based catalyst, temperature of 200° C. and pressure of 5 bar and assuming a conversion of 80% of the CO contained in the purge gas; (3) For the "invention" case, the purge gas signifies the residual gas arising from the Fischer-Tropsh section.

Example 3

Figure 3:
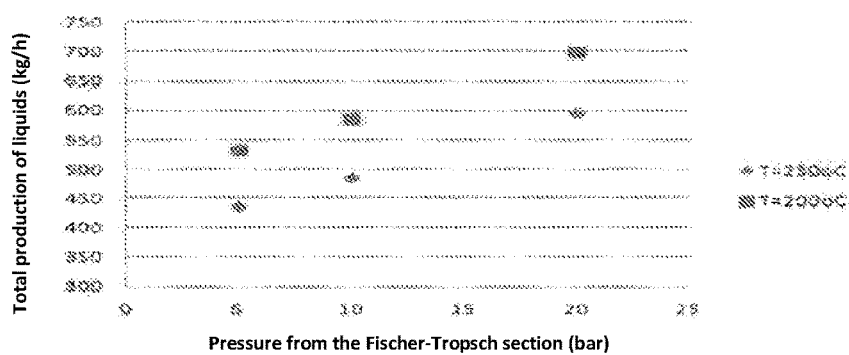
FIG. 3 illustrates the effect of the pressure and the temperature used in the Fischer-Tropsch section on production of liquid by-products using the purge gas from a steam-reforming production unit, in accordance with this invention.

In this example, according to this invention, the process conditions (pressure and temperature) of the Fischer-Tropsch section are altered and the impact on the production of liquid by-products is quantified. The data from the unit are those presented in the "design" condition from Table 1, and the results in FIG. 3.

As can be seen from the invention described herein, the solution of the present invention provides increased production of liquid hydrocarbons with low investment, integrating a small-scale Fischer-Tropsch process into existing units at the hydrogen generation, distillation and hydrotreatment refinery. Thus it is possible to obtain high-quality liquid fuels that do not have sulfur, reducing vehicular emissions.

Furthermore, the use of dedicated synthesis gas production units for use as feedstock in Fischer-Tropsch processes is avoided, which are high in cost. As this refers to small-scale production, the investment in separation and purification sections, taking advantage of gaps in existing sections of the distillation refinery, hydrotreatment and treatment of effluents, are avoided, so that the Fischer-Tropsch process is economical. Furthermore, a small-scale Fischer-Tropsch process may undergo unscheduled stoppages without significant loss of production of liquid products, which would not occur in a large-scale complex constituted of synthesis gas generation associated with the Fischer-Tropsch process. A high production volume may be obtained with installation of small-scale units at several refineries.

Countless variations to the scope of protection of this application are allowed. Thus, the fact that the present invention is not limited to the particular configurations/embodiments described above is reinforced.

The invention claimed is:

1. A process for preparing liquid hydrocarbons by the Fischer-Tropsch process integrated into refining units, wherein the process comprises recycling the gaseous stream from the steam-reforming hydrogen generation process as feedstock in the Fischer-Tropsch process, in which the carbon dioxide content is at least 20% and the hydrogen content is lower than 50% v/v; and wherein the gaseous stream from the steam-reforming hydrogen generation process is from the pressure swing absorption (PSA) section.

2. The process of claim 1, wherein the gaseous stream from the steam-reforming hydrogen generation process is a purge gas stream comprising 25 to 35% hydrogen, 35 to 55% carbon dioxide, 10 to 30% methane, and 8 to 15% carbon monoxide.

3. The process of claim 2, wherein the $H_2:CO$ ratio is of about 1.2 and about 5.5 mol/mol.

4. The process of claim 1, wherein the Fischer-Tropsch process comprises:
compression of the feedstock, coming from the steam-reforming hydrogen generation process, with pressure lower than about 0.5 $kgf/cm^2$ (0.049 MPa) to about 4 to 40 $kgf/cm^2$ (0.39 MPA to 3.92 MPa),
feeding said compressed feedstock into a Fischer-Tropsch reactor and contact with a catalyst, and
optionally, separation of the liquid products obtained in an oleaginous stream, comprising liquid hydrocarbons, and an aqueous stream.

5. The process of claim 2, wherein part of the uncompressed purge gas stream is sent to comprise the reformer fuel.

6. The process of claim 1, wherein the unconverted residual gaseous fraction containing light hydrocarbons returns to the hydrogen generation process with the fuel from the reformer, or optionally, the unconverted residual gaseous fraction containing light hydrocarbons is sent to a light olefins recovery section.

7. The process of claim 4, wherein the catalyst used in the Fischer-Tropsch reaction is selected from cobalt compounds based on alumina, titanium, aluminates, silica, zirconia, or mixtures thereof.

8. The process of claim 7, wherein said catalyst additionally contains noble metals selected from Pt, Re or Ru as promoters.

9. The process of claim 4, wherein the catalyst used in the Fischer-Tropsch reaction is selected from iron compounds containing, optionally, the promoters of silica, copper, noble metals and alkaline metals selected from potassium oxide, copper oxides, silica, zinc oxide, or a combination thereof.

10. The process of claim 4, wherein the Fischer-Tropsch reactor is selected from slurry, fluidized, fixed-bed, or moveable bed-type reactors.

11. The process of claim 1, wherein the Fischer-Tropsch reaction temperature is between about 180° C. and 300° C., and pressures between about 4 and 30 $kgf/cm^2$ (0.39 and 2.94 MPa).

12. The process of claim 1, wherein the Fischer-Tropsch reaction temperature is between about 250° C. and 400° C.

13. The process of claim 1, wherein the liquid hydrocarbons are gasoline, diesel, or lubricants.

14. The process of claim 1, wherein the gaseous stream from the steam-reforming hydrogen generation process is from already-existing refining units.

15. The process of claim 4, wherein the oleaginous stream containing liquid hydrocarbons obtained in the Fischer-Tropsch process are recycled into the existing refinery sections.

16. The process of claim 4, wherein the aqueous stream generated in the Fischer-Tropsch process is recycled to an existing acid water unit of the refinery.

17. The process of claim 10, wherein the Fischer-Tropsch reactor is a mili or micro-channel type compact reactor.

18. The process of claim 11, wherein the Fischer-Tropsch reaction temperature is between about 190° C. and 250° C.

19. The process of claim 15, wherein the oleaginous stream containing liquid hydrocarbons obtained in the Fischer-Tropsch process are recycled into distillation, hydrotreatment and effluent treatment sections.

* * * * *